UNITED STATES PATENT OFFICE.

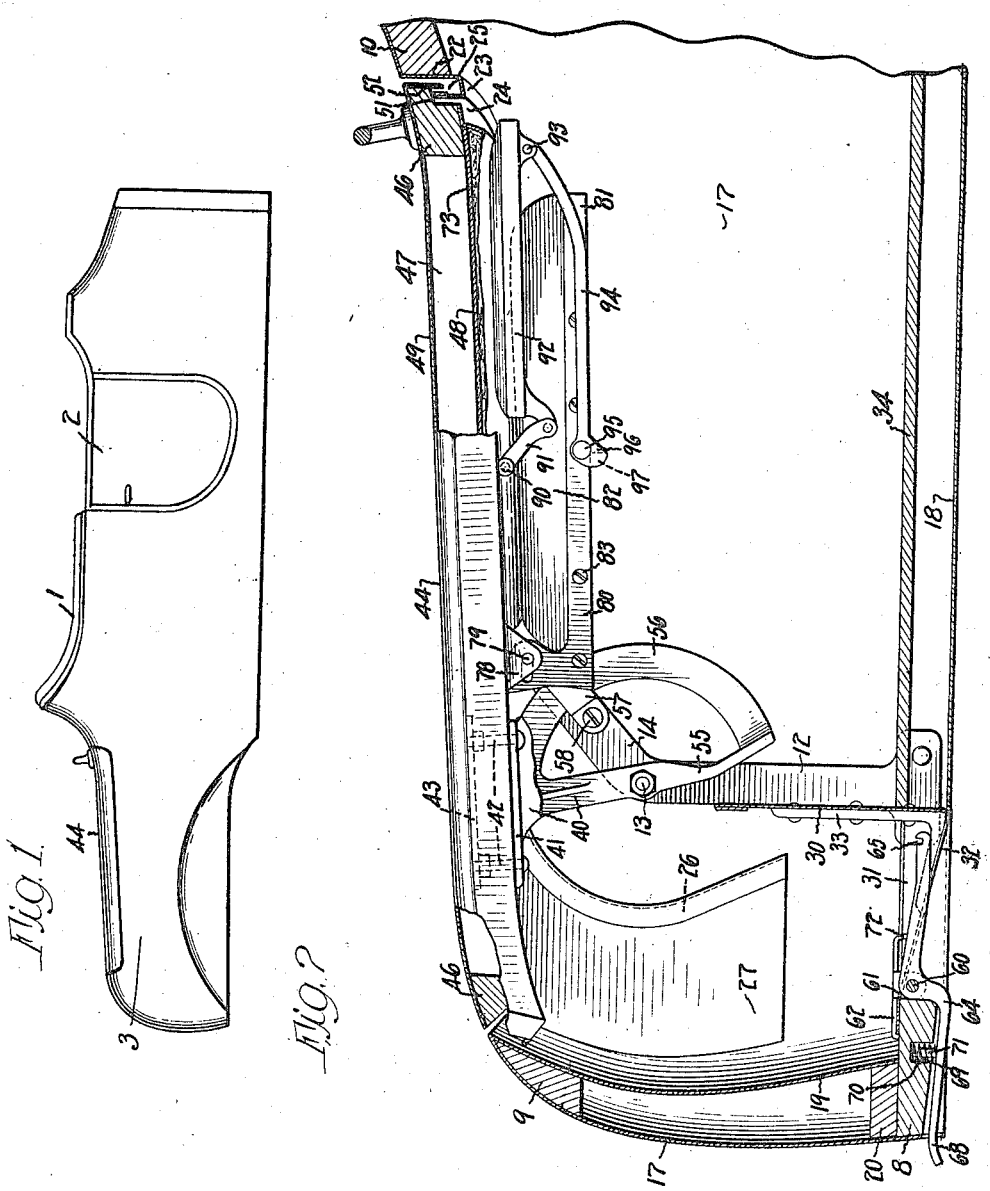

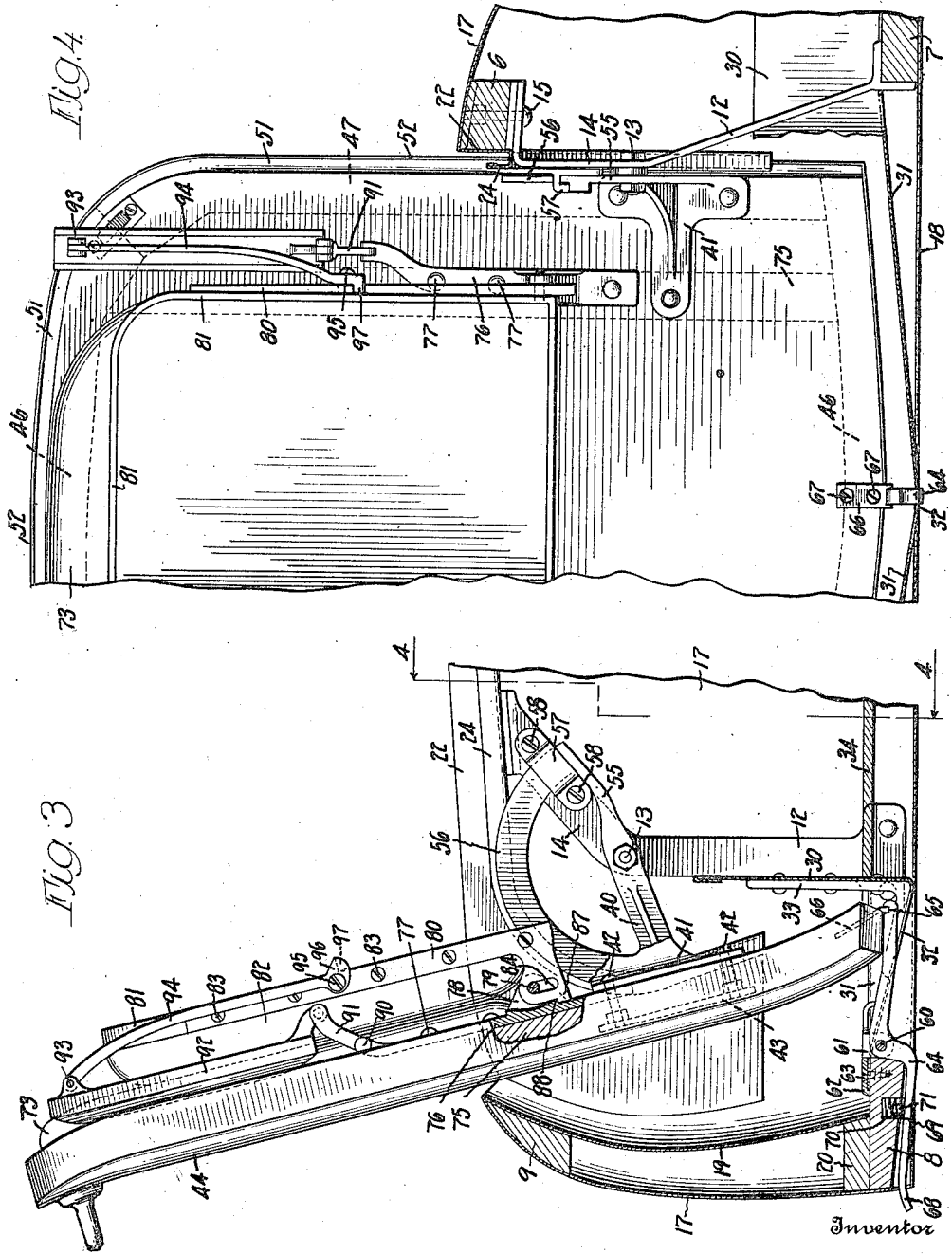
F. KIEHLER.
COLLAPSIBLE VEHICLE SEAT.
APPLICATION FILED AUG. 19, 1914.
1,156,408.
Patented Oct. 12, 1915.
3 SHEETS—SHEET 2.

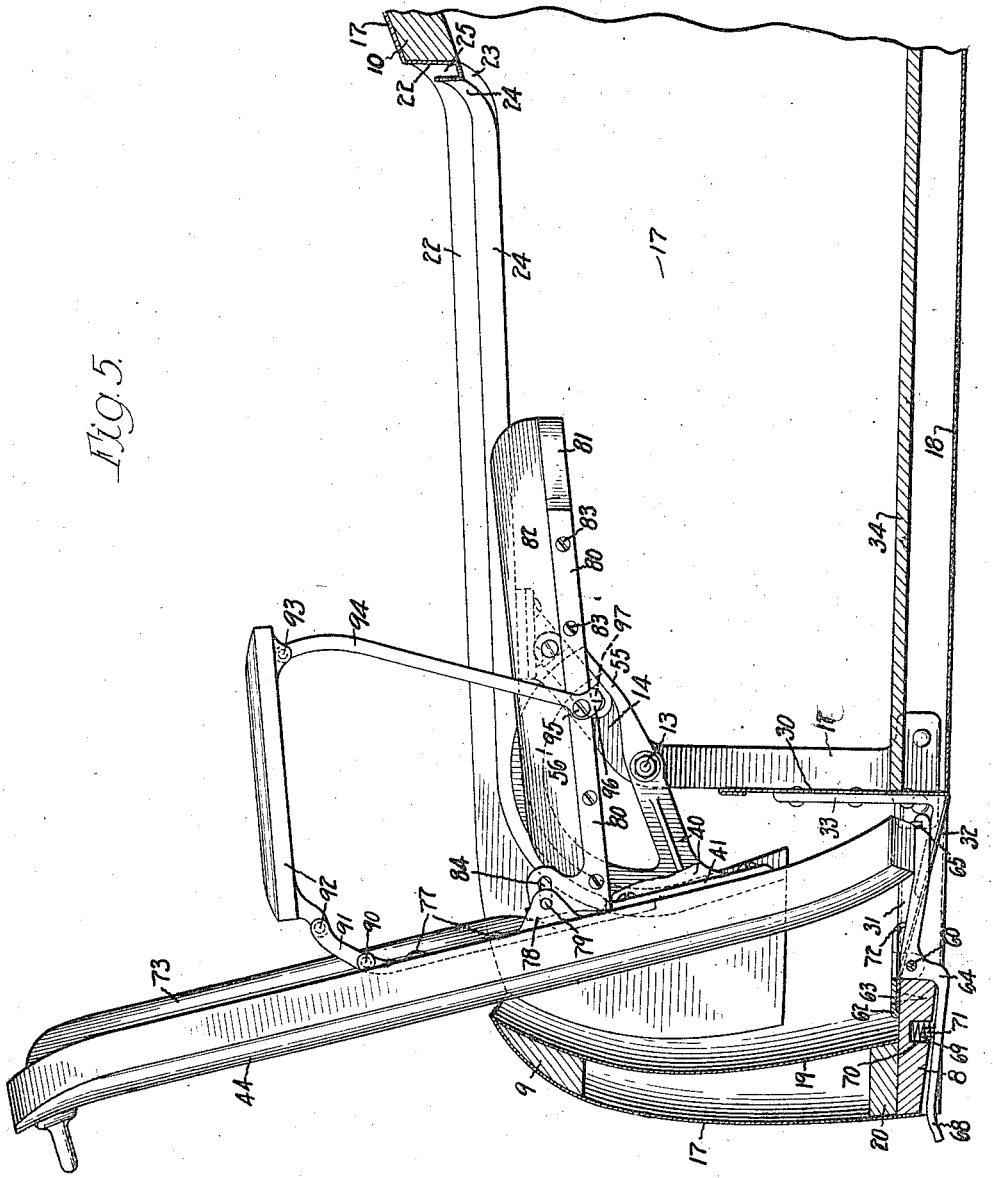

FREDERICK KIEHLER, OF DETROIT, MICHIGAN.

COLLAPSIBLE VEHICLE-SEAT.

1,156,408.　　　　　Specification of Letters Patent.　　Patented Oct. 12, 1915.

Application filed August 19, 1914.　Serial No. 857,443.

*To all whom it may concern:*

Be it known that I, FREDERICK KIEHLER, a citizen of the United States, and a resident of Detroit, in the county of Wayne and State of Michigan, have invented a new and Improved Collapsible Vehicle-Seat, of which the following is a specification.

This invention relates to a collapsible seat for vehicles, particularly automobiles, and its object is to provide a seat of this character, the various parts of which, when collapsed, will lie close the plane of the top of the vehicle to form a cover for an opening therein, and to allow the space beneath to be used for storage purposes.

Its object is also to improve the construction of collapsible seats generally.

The invention consists in the details of construction shown, described and particularly pointed out in the claims.

In the drawings, Figure 1 is a side view of a vehicle body showing the relation of my improved seat to the rest of the body when in folded position. Fig. 2 is a similar fragmentary longitudinal section of the seat and adjacent portions of the body on a larger scale. Fig. 3 is a fragmentary longitudinal section showing the seat-back in extended position, the bottom and arms being folded in respect thereto. Fig. 4 is a section on the line 4—4 of Fig. 3, parts being broken away. Fig. 5 is a longitudinal section showing the seat in extended position.

Similar reference characters refer to like parts throughout the several views.

In the embodiment of my invention shown, the vehicle body is that of a well-known "roadster" type of automobile, comprising the seat portion 1, to which access is had through the door 2, and the inclosed rear 3, the latter of which is provided with an opening, preferably substantially rectangular, in its upper side. The supporting frame of the rear portion may be constructed in various ways, but, as shown, includes the upper longitudinal sills 6, the lower longitudinal sills 7, the lower rear cross-sill 8, the upper rear cross-sill 9 and the upper forward cross-sill 10, the upper sills together extending around and substantially defining the opening previously mentioned.

Rising from each of the lower sills 7 and riveted thereto if desired, is a bracket 12 that constitutes a support for a bolt or pivot 13, and is bent forwardly at 14 for a purpose hereinafter specified, being finally joined to the upper sill 6 by the rivets 15, or in any other preferred manner.

The sides, rear end, and front portion of the top of the body are preferably closed by a sheet metal plate 17 that may be continued crosswise of the lower side of the body to form the bottom 18; and the rear end of the body is preferably lined by the sheet metal plate 19 (the upper part of which is curved substantially concentric with the pivots 13 on the brackets 12) that may be supported by the sill 9 and the filler 20, the latter of which may rest upon the sill 8. Along the front and side edges of the opening in the body, the plate 17 is preferably turned downwardly at 22, then inwardly at 23 and upwardly at 24 to form a trough 25 that is inclined gradually downwardly from the front of the opening to a point at each side substantially above the pivot 13, as best shown in Fig. 5. The trough is continued rearwardly from the points last mentioned substantially in the arc of a circle concentric with the pivot 13, as best indicated at 26, Fig. 2, the side 22 of the trough being correspondingly continued downwardly at 27 and joined to the liner plate 19 in an obvious manner. It will be seen that water received in the trough 25 will be conducted rearwardly and discharged from the lower end of the curved portion 26. The liquid thus discharged is excluded from the space forward of the brackets 12 by means of the cross-plate 30, the lower end 31 of which is bent upwardly and rearwardly at each side and is inclined from each side toward the longitudinal center of the body, near which it is slotted at 32, whereby the liquid is discharged from the body. The inclined and vertical portions of the cross-plate 30 may be reinforced by the brackets 33, if desired; and the space forward of the brackets 12 is preferably provided with a false bottom 34 that rests on the sills 7 and is of strength sufficient to support trunks, tools, etc., that may at intervals be stored thereon.

Mounted to swing vertically on the pivots 13 by means of the bracket arms 40, provided with the lateral flanges 41, to which it may be joined by the rivets or bolts 42 and anchor plate 43, is a seat-back 44. This back may be constructed in various ways, but I prefer to form it of the cross bars 46, the side bars 47, the front plate 48 and the back plate 49. The upper cross bar and the side bars are preferably notched at 51 (Figs. 2 and 4); and the back plate may be bent over the edges of the front and side bars, and may project along the side of the notch as indicated at 52. When the seat-back is at the forward limit of its swinging movement, the side 24 of the trough 25 is received in the notch 51, and the projecting portion 52 of the back plate 49 is received in the trough 25. In this manner, liquid, falling on the back plate 49 when in folded position, is discharged from the edge 52 into the trough 25.

The bracket arms 40 have formed therewith the arms 55 that project on the opposite side of the pivot 13; and the ends of the arms 40 and 13 are joined by the arc 56 that is concentric with the pivot 13. Arc 56 is received in and guided by a clip 57 that may be connected to the inclined portion 14 of the bracket 12 by means of the screws 58, the clip 57 serving to limit counter-clockwise movement of the seat-back about the pivot 13 (Fig. 3). Pivotally mounted at 60 upon the arms 61 of a bracket 62 that may be secured to the cross-sill 8 by the screws 63, is a lever 64 that may swing vertically in the slot 32. The forward end of the lever is notched at 65 to receive the plate 66 that may be secured to the lower cross-bar 46 by the screws 67 and projects from the lower edge of the seat-back 44. The rear end 68 of the lever may project through the rear wall of the body, and is urged in a counter-clockwise direction (Fig. 3) by the compression spring 69 that is received in the seat 70 in the sill 8 and engages with the projection 71 on the lever. The throw of the lever in a counter-clockwise direction may be limited by the downwardly extending portion 72 of the bracket 62. When the seat-back is swung into the position shown in Figs. 3 and 5, the end of the plate 66 is snapped into engagement with the notch 65 on the latch lever 64, and the seat is thereby prevented from swinging forwardly about the pivots 13.

The central portion 73 of the front side of the seat-back is upholstered to afford a resilient rest for the back of the user. The seat-back is provided on each side with a filler 75 (Fig. 4) that preferably extends from top to bottom between the plates 48 and 49; and the plate 48 may be slotted to receive the bracket 76 that is attached to the filler by the rivets 77. Extending forwardly from each of the brackets 75 is a pair of spaced ears 78, joined by a pivot 79 that constitutes a support for the strip 80, preferably L-shaped, to which the frame 81 of the upholstered seat bottom 82 may be attached by the screws 83. The pivot 79 is received in the slot 84 that extends, when the seat bottom is folded up against the seat-back, longitudinally of the said back; and the end of the strip 80 is provided with the projection 87 that is adapted to engage beneath the rib 88 on the bracket 76 when the pivot is in the upper end of the slot 84 (Fig. 3). In extending the seat, the bottom is swung inwardly against the back, compressing the upholstering and swinging the projection 87 outwardly until it clears the rib 88, after which the seat bottom is slid upwardly a distance substantially equal to the length of the slot. It is then swung downwardly about the pivot into the operative position shown in Fig. 5. It will be noticed that the seat bottom, when folded along the seat-back, lies in juxtaposition thereto and is prevented from rattling or vibrating about the pivot 79 by the resiliency of the contacting upholstering on the seat bottom and back.

Mounted on the upper end of the bracket 76 is a pivot 90 that supports a link 91, which, in turn, is pivotally connected to the rear end of the seat-arm 92. The front end of the arm is pivotally connected at 93 to a brace or link 94 that is capable of swinging in a vertical plane about the pivot 95 on the strip 80; and the inner end of the brace is extended laterally at 96 and transversely at 97 into the plane of the strip.

When the parts are in the completely folded position (Fig. 2), the projection 97 engages with the lower surface of the strip 80 at a point to the rear of the pivot 95 and supports the arm in close proximity to the lower surface of the seat-back, leaving a large proportion of the space between the seat-back and the false bottom 34 available for storage purposes. It will also be noticed that the upholstering on the seat-arm is then compressed against the seat-back, whereby the projection 97 and the seat bottom are held in resilient engagement with each other, and the seat-arm is prevented from vibrating or rattling. When the seat-back is swung up into the position indicated in Fig. 3, the seat bottom is retained parallel thereto by the action of the pivot 79, projection 87 and rib 88, and the upholstering on the seat-arm is maintained in resilient contact with the seat-back by engagement of the projection 97 with the front surface of the strip 80. The parts are, therefore, in position to allow convenient access to the storage space above the false bottom 34. As the seat bottom is swung downwardly about the pivot 79 in the manner heretofore indicated, the arm swings outwardly therefrom into the position shown in Fig. 5, its inner end being prevented from swinging downwardly about the pivot 90 by the engagement of the projection 97 with the lower surface of the strip 80; and in order to insure this action the length of the parts is preferably made such that the pivot 92 lies somewhat above the line joining the pivot 90 with the pivot 93.

It is clear that many changes may be made in the details of construction without departing from the spirit of my invention. I do not, therefore, wish to be limited otherwise than as indicated by the subjoined claims.

I claim:—

1. In combination, a vehicle body comprising a bottom, sides, a rear end and a top, said top and bottom being spaced somewhat from one another to provide storage space and said top having an opening therein, a seat-back mounted to swing vertically in respect to the body from a position in which it is adapted to constitute a rest for the back of the user to a position in which it serves as a closure for the opening, said seat-back, when in the latter position, being arranged to lie substantially in the plane of the top of the vehicle body whereby the storage space is largely rendered available for storage purposes and having its lower end, when in the former position, inclosed by the sides and rear end of the body, and means, comprising fixed pivots, for connecting the seat-back to the body.

2. In combination, a vehicle body comprising a bottom, sides, a rear end and a top, said top and bottom being spaced somewhat from each other to provide storage space and said top having an opening therein, a cross-wall joining the sides of the body at a point near the rear end, a seat back mounted to swing vertically in respect to the body from a position in which it is adapted to constitute a rest for the back of the user to a position in which it serves as a closure for the opening, said seat back when in the latter position, being arranged to lie substantially in the plane of the top of the vehicle body whereby the storage space is largely rendered available for storage purposes, said cross-wall, together with the sides and rear end of the body, forming a compartment in which the lower end of the seat back is received when in position to serve as a rest for the user.

3. In combination, a vehicle body comprising a bottom, sides and a top, said top and bottom being spaced somewhat from each other to provide storage space and said top having an opening therein, a cross-wall joining the sides of the body at a point near the rear end, a seat back mounted to swing vertically in respect to the body from a position in which it is adapted to constitute a rest for the back of the user to a position in which it serves as a closure for the opening, said seat back when in the latter position, being arranged to lie substantially in the plane of the top of the vehicle body whereby the storage space is largely rendered available for storage purposes, and means for forming a trough along a portion of the edge of the opening in the top, said trough leading to the space at the rear of the cross-wall, whereby water that leaks between the seat back and the corresponding edge of the opening may be received and conducted to the space at the rear of the cross-wall.

4. In combination, a vehicle body comprising a bottom, sides, a rear end and a top, said top and bottom being spaced somewhat from each other to provide storage space and said top having an opening therein, a cross-wall joining the sides of the body at a point near the rear end, a seat back mounted to swing vertically in respect to the body from a position in which it is adapted to constitute a rest for the back of the user to a position in which it serves as a closure for the opening, said seat back when in the latter position, being arranged to lie substantially in the plane of the top of the vehicle body whereby the storage space is largely rendered available for storage purposes, means for forming a trough along a portion of the edge of the opening in the top, said trough leading to the space at the rear of the cross-wall, whereby water that leaks between the seat back and the corresponding edge of the opening may be received and conducted to the space at the rear of the cross wall, a closure extending between the lower portion of the cross-wall and the rear end of the body for excluding dust, said closure having an opening through which water discharged from the trough may pass out of the vehicle body.

5. In combination, a vehicle body comprising a bottom, sides and a top, said top and bottom being spaced somewhat from one another to provide storage space and said top having an opening, a seat back mounted to swing vertically in respect to the body from a position in which it is adapted to constitute a rest for the back of the user to a position in which it serves as a closure for the opening, said seat back, when in the latter position, being arranged to lie substantially in the plane of the top of the vehicle body whereby the storage space is largely rendered available for storage purposes, a latch lever pivoted in the body, and means, carried by the seat back, with which the latch lever is adapted to engage for holding the seat back in the first mentioned position.

6. In combination, a vehicle body comprising a bottom, sides and a top, said top and bottom being spaced somewhat from one another to provide storage space and said top having an opening, a seat back mounted to swing vertically in respect to the body from a position in which it is adapted to constitute a rest for the back of the user to a position in which it serves as a closure for the opening, said seat back, when in the latter position, being arranged to lie substantially in the plane of the top of the vehicle body whereby the storage space is largely rendered available for storage purposes, a lever pivoted in the body, means carried by the seat back with which the lever is adapted to engage for holding the seat back in the first mentioned position, and resilient means for holding the lever in position to engage with the means on the seat back.

7. In combination, a vehicle body comprising a bottom, sides and a top, said top and bottom being spaced somewhat from one another to provide storage space and said top having an opening, a seat back mounted to swing vertically in respect to the body from a position in which it is adapted to constitute a rest for the back of the user to a position in which it serves as a closure for the opening, said seat back, when in the latter position, being arranged to lie substantially in the plane of the top of the vehicle body whereby the storage space is largely rendered available for storage purposes, a lever pivoted in the body, means carried by the seat back with which the lever is adapted to engage for holding the seat back in the first mentioned position, resilient means tending to swing the lever into position to engage with the means on the seat back, and means for limiting the distance the lever may be turned by the resilient means.

8. In combination, a vehicle body comprising a bottom, sides and a top, said top and bottom being spaced somewhat from one another to provide storage space and said top having an opening, a seat back mounted to swing vertically in respect to the body from a position in which it is adapted to constitute a rest for the back of the user to a position in which it serves as a closure for the opening, said seat back, when in the latter position, being arranged to lie substantially in the plane of the top of the vehicle body whereby the storage space is largely rendered available for storage purposes, said seat back and body constituting two members, resilient latch means carried by one of the members and engaging with the other for holding the seat back in the first mentioned position.

9. In combination, a vehicle body comprising a bottom, sides and a top, said top and bottom being spaced somewhat from one another to provide storage space and said top having an opening therein, a seat back mounted to swing vertically in respect to the body from a position in which it is adapted to constitute a rest for the back of the user to a position in which it serves as a closure for the opening, a seat bottom mounted to swing vertically in respect to the seat back, means for resiliently holding the seat bottom in close proximity to the lower side of the seat back when the latter is in position to close the opening, whereby vibration of the seat bottom in respect to the seat back is avoided, and whereby the storage space is largely rendered available for storage purposes, said resilient means being automatically stressed as the seat bottom is swung to the last named position.

10. In combination, a support, a seat back mounted to swing vertically in respect thereto, a seat bottom pivotally carried by the seat back and adapted to be swung from a position at an angle to the plane of the seat back to a position substantially parallel thereto, and means for resiliently holding the seat bottom in parallel relation to the seat back, said resilient means being automatically stressed as the seat bottom is swung to the last named position.

11. In combination, a support, a seat comprising two members, one a seat back mounted to swing vertically on the support and the other a seat bottom adapted to be swung from a position at an angle to the seat back to a position substantially parallel thereto, upholstering for one of the members adapted to engage with the other member when the bottom is in the last mentioned position, and means stressed by the resiliency of the upholstering for pivotally connecting the bottom to the seat back.

12. In combination, a support, a seat comprising two members, one a seat back mounted to swing vertically on the support, and the other a seat bottom adapted to be swung from a position at an angle to the seat back to a position substantially parallel thereto, upholstering for one of the members adapted to engage with the other member when the bottom is in the last mentioned position, a pivot secured to one of the members, a slotted member carried by the other member, the pivot being received in the slot, and means for preventing the seat bottom from swinging in one direction and for holding it substantially parallel to the seat back when the pivot is at one end of the slot, said means being stressed by the resiliency of the upholstering.

13. In combination, a support, a seat comprising two members, one a seat back and the other a seat bottom adapted to be swung from a position at an angle to the seat back to a position substantially parallel thereto, resilient means carried by one of the members stressed when the seat bottom is in the position last mentioned, means for pivotally connecting the bottom to the seat back, and means, stressed by the resilient means, for locking the seat bottom in position parallel to the seat back.

14. In combination, a support, a seat comprising two members, one a seat back and the other a seat bottom adapted to be swung from a position at an angle to the seat back to a position substantially parallel thereto, resilient means carried by one of the members, a pin and slot connection between the two members, and means whereby, when the pin is in one position in the slot, the resilient means is stressed and the seat bottom is held in substantially parallel relation to the seat back.

15. In combination, a support, a seat comprising two members, one a seat back and the other a seat bottom adapted to be swung from a position at an angle to the seat back to a position substantially parallel thereto, a pin and slot connection between the two members, resilient means carried by one of the members at one side of the pin and slot connection, and means, located on the opposite side of the pin, when the pin is in one position in the slot, for retaining the seat bottom in substantially parallel relation to the seat back when the resilient means is stressed, said means being stressed by the action of the resilient means.

16. In combination, a support, a seat comprising two members, one a seat back and the other a seat bottom adapted to be swung from a position at an angle to the seat back to a position in folded relation thereto, a pin and slot connection between the members, resilient means carried by one of the members at one side of the pin and slot connection, a projection on one of the members and a rib on the other member, the last mentioned elements being located on the side of the pin opposite from the resilient means, when the pin is in one position in the slot, said resilient means being stressed when the seat bottom is folded in respect to the seat back, and itself serving to hold the projection and rib in engagement with each other, whereby the seat bottom is locked in folded position.

17. In combination, a support, a seat comprising two members, one a seat back and the other a seat bottom adapted to be swung from a position at an angle to the seat back to a position in folded relation thereto, a pin and slot connection between the members, a projection on one of the members and a rib on the other member, the last mentioned elements being located on the side of the pin opposite to the major portion of the seat bottom when the pin is in one position in the slot, said projection and rib being arranged to mutually engage with each other and to prevent the bottom from accidentally being swung from folded relation to the seat back to the position at an angle thereto.

18. In combination, a vehicle body comprising a bottom, sides and a top, said bottom and top being spaced somewhat from one another to provide storage space and said top having an opening therein, a seat back mounted to swing vertically in respect to the body from a position in which it is adapted to constitute a rest for the back of the user to a position in which it serves as a closure for the opening, a seat bottom mounted to swing vertically in respect to the seat back, said seat bottom being arranged to lie in close proximity to the lower side of the seat back when the latter is in position to close the opening, a seat arm mounted to swing vertically in respect to the seat back from a position in which it is at a higher level than the seat bottom and substantially parallel thereto, to a position in which it is in close proximity to the lower side of the seat back when the latter is in position to close the opening, whereby the storage space is largely rendered available for storage purposes.

19. In combination, a vehicle body comprising a bottom, sides and a top, said bottom and top being spaced somewhat from one another to provide storage space and said top having an opening therein, a seat back mounted to swing vertically in respect to the body from a position in which it is adapted to constitute a rest for the back of the user to a position in which it serves as a closure for the opening, a seat bottom mounted to swing vertically in respect to the seat back, said seat bottom being arranged to lie in close proximity to the lower side of the seat back when the latter is in position to close the opening, a seat arm mounted to swing vertically in respect to the seat back from a position in which it is at a higher level than the seat bottom and substantially parallel thereto, to a position in which it is in close proximity to the lower side of the seat back when the latter is in position to close the opening, means engaging with the seat bottom for supporting the seat arm in the last mentioned position, whereby the storage space is largely rendered available for storage purposes.

20. In combination, a vehicle body comprising a bottom, sides and a top, said bottom and top being spaced somewhat from one another to provide storage space and said top having an opening therein, a seat back mounted to swing vertically in respect to the body from a position in which it is adapted to constitute a rest for the back of the user to a position in which it serves as a closure for the opening, a seat bottom mounted to swing vertically in respect to the seat back, said seat bottom being arranged to lie in close proximity to the lower side of the seat back when the latter is in position to close the opening, a seat arm mounted to swing vertically in respect to the seat back from a position in which it is at a higher level than the seat bottom and substantially parallel thereto, to a position in which it is in close proximity to the lower side of the seat back when the latter is in position to close the opening, the seat back and the seat arm constituting two members, resilient means carried by one of the last mentioned members and engaged by the other when the seat arm is in proximity to the seat back whereby the resilient means is stressed, and means, engaging with the seat bottom when in the last mentioned position, for positively supporting the seat arm, said means being stressed by the resilient means, whereby the seat arm is prevented from vibrating in respect to the seat back and whereby the storage space is largely rendered available for storage purposes.

21. In combination, a support, a seat back mounted to swing vertically thereon, a seat bottom adapted to swing vertically in respect to the seat back from a position in which it extends at an angle thereto to a position in which it lies substantially parallel thereto, a seat arm mounted to swing from a position in which it is substantially parallel to and located at a higher level than the seat bottom to a position in which it is substantially parallel to the seat back, a link pivotally supported on the seat bottom, a pivot joining the link to the outer end of the seat arm, a second link, a pivot connecting one end of the second link to the seat body, another pivot connecting the other end of the second link to the inner end of the seat arm, and means on the first mentioned link engaging with the seat bottom to limit angular movement of the link in one direction in respect to the seat bottom.

22. In combination, a support, a seat back mounted to swing vertically thereon, a seat bottom adapted to swing vertically in respect to the seat back from a position in which it extends at an angle thereto to a position in which it lies substantially parallel thereto, a seat arm mounted to swing from a position in which it is substantially parallel to and located at a higher level than the seat bottom to a position in which it is substantially parallel to the seat back, a link pivotally supported on the seat bottom, a pivot joining the link to the outer end of the seat arm, a second link, a pivot connecting one end of the second link to the seat body, another pivot connecting the other end of the second link to the inner end of the seat arm, means on the first mentioned link engaging with the seat bottom to limit angular movement of the link in one direction in respect to the seat bottom, the seat back and the seat bottom constituting two members, resilient means carried by one of the members and engaging with the other member when the seat arm is parallel to the seat back, whereby the means for limiting the angular movement of the first mentioned member is placed under stress.

23. In combination, a vehicle body comprising a bottom, sides and a top, said top and bottom being spaced somewhat from one another to provide storage space and said top having an opening, a seat back mounted to swing vertically in respect to the body from a position in which it is adapted to constitute a rest for the back of the user to a position in which it serves as a closure for the opening, said seat back, when in the latter position, being arranged to lie substantially in the plane of the top of the vehicle body whereby the storage space is largely rendered available for storage purposes, said seat back and body constituting two members, a lever carried by one of the members and arranged to engage the other member when the seat back is in the position first mentioned, and resilient means for forcing the lever into engaging position.

24. In combination, a support, a seat back mounted to swing vertically in respect thereto, a seat bottom carried by the seat back and adapted to be moved from a position at an angle to the plane of the seat back to a position substantially parallel thereto, and means for resiliently holding the seat bottom in the last named relation to the seat back, said resilient means being automatically stressed as the seat bottom is moved into parallel relation to the seat back.

25. In combination, a support, a seat comprising two members, one a seat back mounted to swing vertically on the support and the other a seat bottom adapted to be moved from a position at an angle to the seat back to a position substantially parallel thereto, upholstering for one of the members arranged to exert stress on the other member when the seat bottom is in the last named position whereby rattling is prevented, and means for locking the seat bottom to the seat back.

26. In combination, a support, a seat back mounted to swing vertically in respect thereto, a seat bottom pivotally carried by the seat back and adapted to be swung from a position at an angle to the plane of the seat back to a position substantially parallel thereto, and means for resiliently locking the seat bottom in parallel relation thereto, said locking means being incapable of being unlocked except by a force of such nature as to overcome the strength of the resilient means.

27. In combination, a support, a seat comprising two members, one a seat back mounted to swing vertically on the support and the other a seat bottom adapted to be moved from a position at an angle to the seat back to a position substantially parallel thereto, upholstering for one of the members and means stressed by the resiliency of the upholstering for locking the seat bottom and seat back together when the bottom is in the last named position, whereby rattling is prevented.

28. In combination, a support, a seat back mounted to swing vertically in respect thereto, a seat arm connected to the seat back so as to swing from a position at an angle to the plane of the seat back to a position substantially parallel thereto, and means for resiliently holding the seat arm in parallel relation to the seat back.

29. In combination, a support, a seat back mounted to swing vertically in respect thereto, a seat arm connected to the seat back so as to swing from a position at an angle to the plane of the seat back to a position substantially parallel thereto, a seat bottom also connected to the seat back so as to swing from a position at an angle to the plane of the seat back to a position substantially parallel thereto, and means for resiliently holding the seat arm and the seat bottom in parallel relation to the seat back.

30. In combination, a support, a seat comprising three members, one a seat back mounted to swing vertically on the support, another a seat bottom adapted to be swung from a position at an angle to the seat back to a position substantially parallel thereto, and the third a seat arm also adapted to be swung from a position at an angle to the seat back to a position substantially parallel thereto, upholstering for one of the members adapted to engage with another of the members when the arm and bottom are in the last named position, and means stressed by the resiliency of the upholstering for locking the parts together.

In testimony whereof I have signed this specification in the presence of two subscribing witnesses.

FREDERICK KIEHLER.

Witnesses:
  W. E. CRANDALL,
  H. J. LOUNT.